(12) United States Patent
Mead-Lewis

(10) Patent No.: US 6,367,233 B1
(45) Date of Patent: Apr. 9, 2002

(54) CRUPPER PAD ASSEMBLY WITH TAIL BAG

(76) Inventor: Jean Mead-Lewis, 10204 E. 211th, Peculiar, MO (US) 64078

( * ) Notice: Subject to any disclaimer, the term of this patent is extended or adjusted under 35 U.S.C. 154(b) by 0 days.

(21) Appl. No.: 09/607,995

(22) Filed: Jun. 30, 2000

Related U.S. Application Data

(63) Continuation of application No. 09/112,936, filed on Jul. 9, 1998, now Pat. No. 6,085,499.

(51) Int. Cl.⁷ .............................. B68B 3/16; B68B 5/04
(52) U.S. Cl. ............................................. 54/22; 54/78
(58) Field of Search ...................... 54/22, 78; 119/850, 119/868, 869

(56) References Cited

U.S. PATENT DOCUMENTS

| | | | |
|---|---|---|---|
| 718,915 A | | 1/1903 | Cooper |
| 1,064,707 A | * | 6/1913 | Canion ............ 54/78 |
| 2,836,020 A | | 5/1958 | Linscott |
| 3,347,018 A | * | 10/1967 | Laidig ............ 54/78 |
| 3,817,217 A | * | 6/1974 | Matuka et al. ........ 119/868 |
| 4,378,667 A | | 4/1983 | Velarde, Jr. |
| 4,850,181 A | | 7/1989 | Pirotta |
| 4,972,660 A | | 11/1990 | Black |
| 5,025,613 A | | 6/1991 | Connors |
| 5,062,256 A | | 11/1991 | Kingett et al. |
| 5,462,020 A | | 10/1995 | Trimmer |
| 6,085,499 A | * | 7/2000 | Mead-Lewis ........ 54/22 |

OTHER PUBLICATIONS

World Champion Horse Equipment, 1998 Annual Catalog, (pp. 22–25 and 72–73).
P&S Enterprises, Inc., 1996–1997 (pp. 29–31).

* cited by examiner

*Primary Examiner*—Robert P. Swiatek
(74) *Attorney, Agent, or Firm*—Kyle L. Elliott; Blackwell Sanders Peper Martin LLP

(57) ABSTRACT

A crupper pad assembly having a crupper pad (24), tail pad (26), and spacer pad (28) is utilized to pad the crupper (32) of a tail set and hold a horse's tail (30) in the tail set. A tail bag (22) is used in combination with the crupper pad assembly (20) and has a top attachment mechanism (128) which attaches the tail bag (22) to the tail set above the horses anus and with an opening (124) of the tail bag (22) facing away from the horse.

7 Claims, 6 Drawing Sheets

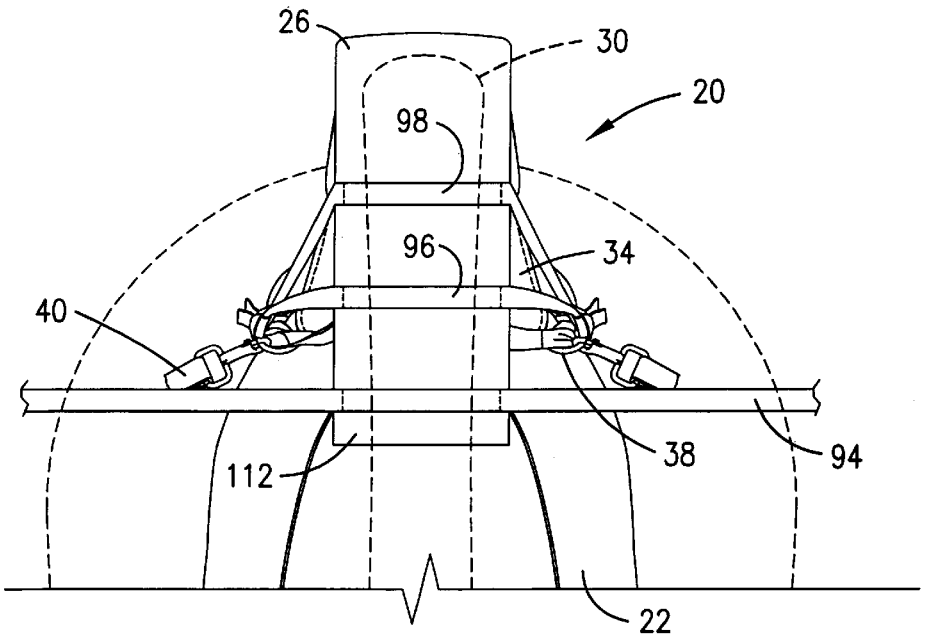
Fig. 12.
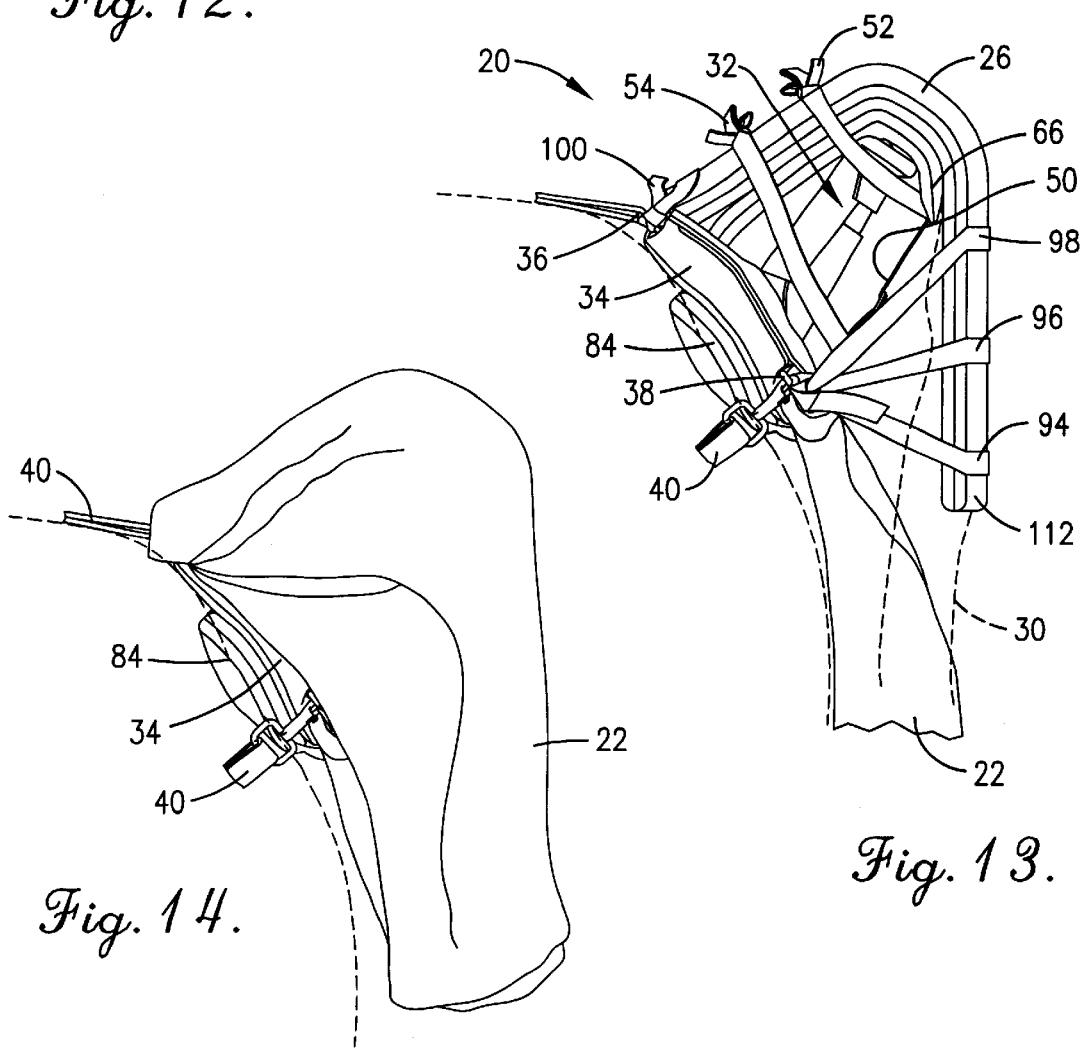
Fig. 13.
Fig. 14.

CRUPPER PAD ASSEMBLY WITH TAIL BAG

This application, filed on Jun. 30, 2000, is a continuation of and claims priority on U.S. patent application Ser. No. 09/112,936, filed Jul. 9, 1998 and now U.S. Pat. No. 6,085,499 issued Jul. 11, 2000,

BACKGROUND OF THE INVENTION

This invention relates to training apparatuses for horses and, more particularly, to tail set accessories including crupper padding and tail bags.

In showing American Saddlebred, Morgan, and Tennessee Walking horse breeds, it is desirable to properly present the horse's tail. The tail, which is allowed to grow very long, should be both properly groomed and held in the proper position, which is substantially erect above the horses rump. To achieve proper positioning, these horses commonly wear tail sets to properly position the horse's tail and train the horse to hold its tail in that position. The key component of the tail set is the crupper. The crupper rests against the horse's rump just below the tail, and engages the tail to hold it in place. The other components of the tail set (back band, belly band, breast strap, etc.) generally operate to hold the crupper in place. To properly train the horse to hold the tail in the correct position, the tail set is worn at all times except in practice and in competition.

While some horses accept the tail set as a fact of life, others are less cooperative, and even the accepting horses object to the tail set when their rump or tail has been rubbed raw by the crupper. In attempts to placate the less cooperative horses and keep the horses' tails and rumps healthy, trainers have conceived of devices to guard the tail from contact with surrounding structure, as shown in U.S. Pat. No. 4,141,197 to Nichols, and have tried to pad the crupper by lining it with cotton sheets, towels, and other materials. However, these materials have proven ineffective to satisfactorily pad the crupper and in some cases, inhibit the function of the crupper.

Because the horse's tall hair is typically long enough to reach the ground, the horse can step on the tail and pull out the long beautiful hair. Further, because of the proximity of the tail to the anus and urethra, proper grooming can clearly be a challenge. In attempts to keep the tail off the ground and from being soiled by feces and urine, tail bags are used to hold and substantially enclose the tails. While the current tail bags are generally effective to keep the tail off the ground, they are only partially effective at preventing urine and feces from soiling the tail. Because of how current tail bags open and how they are secured, feces and urine still make contact with the tail and occasionally urine and/or feces will be deposited directly in the bag.

Thus, it is desirable to increase the effectiveness of padding used on cruppers to enhance the presentation of horses' tails. Such an increase in effectiveness of the crupper padding also makes the horse more accepting of the tail set, so that the horse does not try and rub the crupper against surrounding structure thereby enhancing the operation of the crupper. It is further desirable to use a tail bag which prevents feces and urine from contacting the tail and being deposited in the tail bag to enhance presentation of the horse's tail and reduce the labor required to properly groom the horse's tail.

BRIEF SUMMARY OF THE INVENTION

There is, therefore, provided in the practice of the invention a novel crupper pad for padding a horse's tail held in a tail crupper of a tail set. The crupper pad includes a flexible padding material with a large width base section and a medium width tail padding section. The base section pads the horse's rump, and the tail section pads the horse's tail.

In a preferred embodiment, the crupper pad also includes a crupper foot section having a small width for positioning between the feet of the crupper. Preferably, the tail section tapers in width, and the base and crupper foot sections include opposite convex and concave curves, respectively. An outer sheath preferably encloses the padding material and has a wear resistant material on one side and a smooth skin engaging material on the other side. The crupper pad is secured with an attachment strap extending substantially parallel to the longitudinal axis, and the crupper pad has tail securement straps which wrap around the horse's tail to hold it in the crupper.

There is further provided in the practice of the invention a novel crupper pad and tail positioning assembly for holding and padding a horse's tail in a tail crupper of a tail set. The set includes a flexible crupper pad interposed between the horse's tail and the crupper and a flexible top tail pad placed over the top of the horse's tail. The crupper pad has a plurality of crupper pad tail securement straps, and the tail pad has a plurality of tail pad securement straps. The securement straps operate to comfortably hold the horse's tail in the crupper.

In a preferred embodiment, the crupper pad tail straps comprise top and bottom pairs of straps which extend around the crupper, horse's tail, and top tail pad to hold the horse's tail in the crupper. The top tail pad securement straps include a base pair of straps which tie to the tail set at or near top rings of the crupper and three pairs of tail straps which connect to the tail set at or near bottom rings of the crupper. Preferably, a spacer pad having a circular base portion and an elongated tail portion is positioned between the crupper and the crupper pad. The top tail pad is preferably enclosed in an outer sheath having a wear resistant material on the top side and a skin engaging satin material on the tail side.

There is still further provided in the practice of the invention a novel tail bag inhibiting contaminants from soiling a horse's tail. The tail bag includes a flexible sheet material defining an internal cavity for receiving a horses tail through an opening in the bag. An attachment mechanism is provided which connects the sheet material to the tail set above the horse's anus.

In a preferred embodiment, the tail bag opening faces away from the horse, and the bottom of the bag has a second attachment mechanism for attaching the bottom of the bag adjacent top rings of the crupper. The first attachment mechanism attaches adjacent bottom rings of the crupper. Preferably, corners of the tail bag having corner loops are inserted through the bottom crupper rings and receive the attachment strap of the crupper pad therethrough.

Accordingly, it is an object of the present invention to provide an improved crupper pad for padding a horse's tail in the crupper of a tail set.

It is another object of the present invention to provide and improved crupper pad and tail positioning assembly for holding and padding a horse's tail in the crupper of a tail set.

It is still another object of the present invention to provide an improved tail bag for inhibiting contaminants from soiling a horse's tail.

BRIEF DESCRIPTION OF THE DRAWINGS

These and other inventive features, advantages, and objects will appear from the following Detailed Description of The Preferred Embodiments when considered in connection with the accompanying drawings in which similar reference characters denote similar elements throughout the several views and wherein:

FIG. 12 is a rear view of the crupper padding and tail positioning set of FIG. 9 illustrating connection of the top tail pad of FIG. 3;

FIG. 13 is a side view of the crupper padding and tail positioning set of FIG. 9 illustrating connection of the top tail pad of FIG. 3; and FIG. 14 is a side view of the crupper padding and tail positioning set of FIG. 9 in combination with the tail bag of FIG. 6 illustrating connection of a bottom of the tail bag to the tail set.

DETAILED DESCRIPTION OF THE PREFERRED EMBODIMENTS

Figure 5:
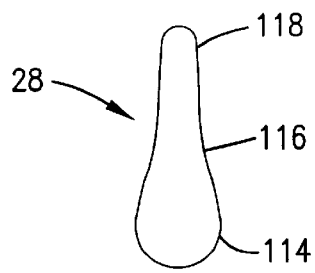
FIG. 5 is a front elevational view of a spacer pad according to the present invention.
Figure 8:
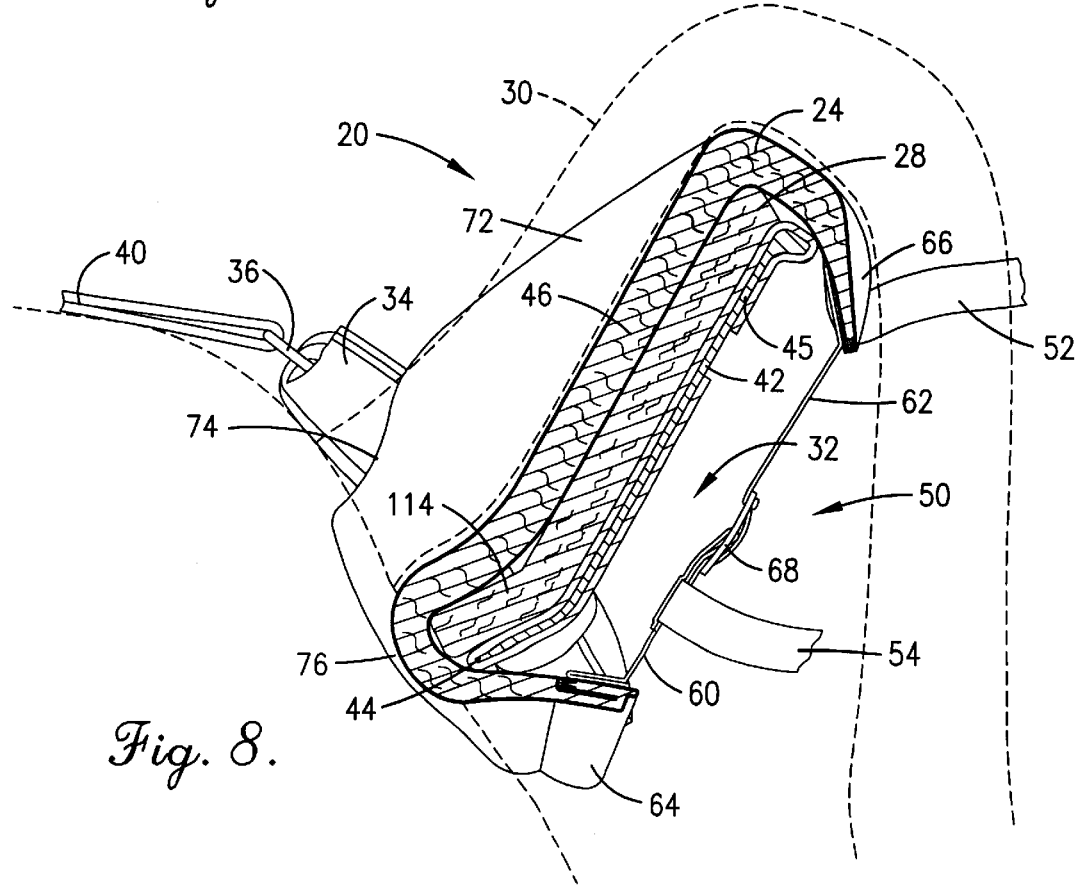
FIG. 8 is vertical cross-sectional view of the crupper pad of FIG. 1 and spacer pad of FIG. 5 attached to a crupper of a tail set.
Figure 9:
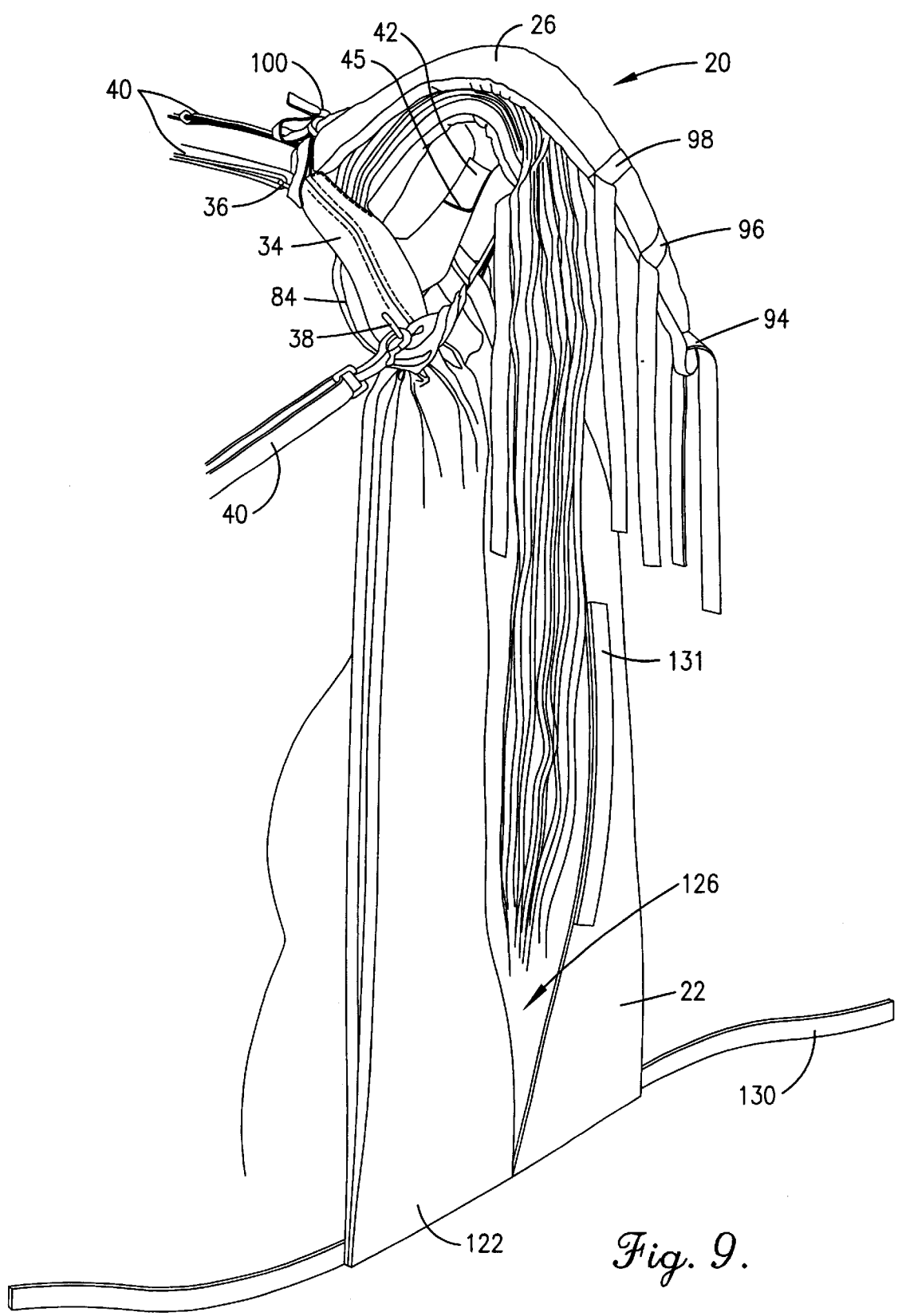
FIG. 9 is a perspective view of a crupper padding and tail positioning set in combination with the tail bag of FIG. 6.

Referring to the drawings in greater detail, FIGS. 8 and 9 show a crupper padding and tail positioning assembly 20 in combination with a tail bag 22. The crupper padding and tail positioning assembly includes a crupper pad 24 (FIG. 1), top tail pad 26 (FIG. 3), and a spacer pad 28 (FIG. 5). The assembly 20 operates to hold and pad a horse's tail 30 in a crupper 32 of a tail set.

Figure 10:
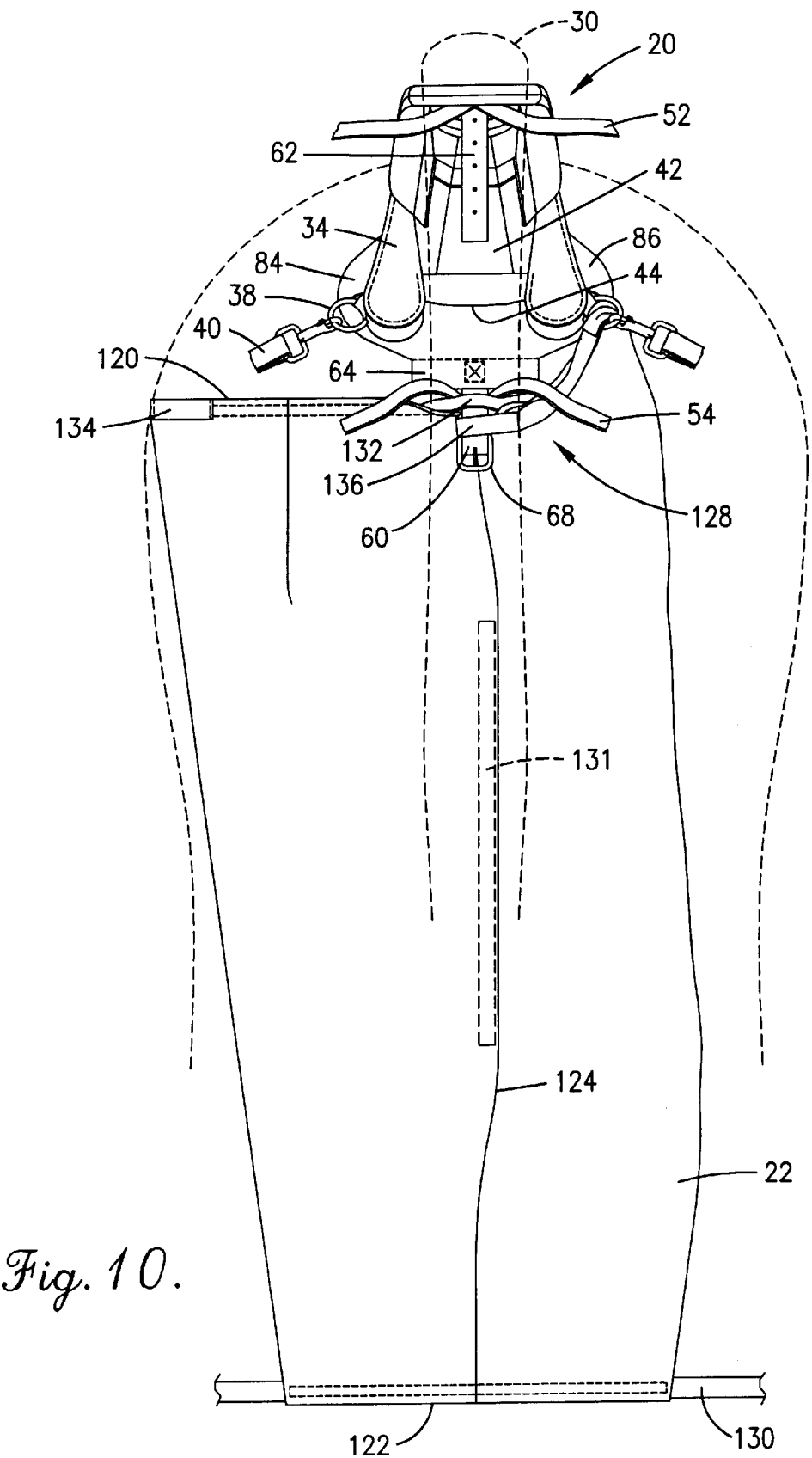
FIG. 10 is a rear view of the crupper padding and tail positioning set of FIG. 9 in combination with the tail bag of FIG. 6 illustrating connection of the tail bag.

Before describing the assembly 20, the crupper 32 will be briefly described to the extent necessary for an understanding of the assembly 20. Referring to FIGS. 8, 9 , and 10, the crupper 32 includes a pair of spaced apart crupper feet 34. Each crupper foot 34 has a top ring 36 and a bottom ring 38 to which tail set straps 40 are connected to hold the crupper 32 in place relative to the horse's tail 30. A rigid, elongated, and arcuate tail rest 42 is attached between the feet 34 near its base 44. The tail rest 42 extends generally upwardly from the feet 34 and receives the horse's tail 30 into the channel of the arc. The base 44 of the tail rest extends a small distance below the feet 34 causing the crupper 32 to rock undesirably. The tail rest 42 is typically provided with a thin layer of cloth padding 45.

Figure 1:
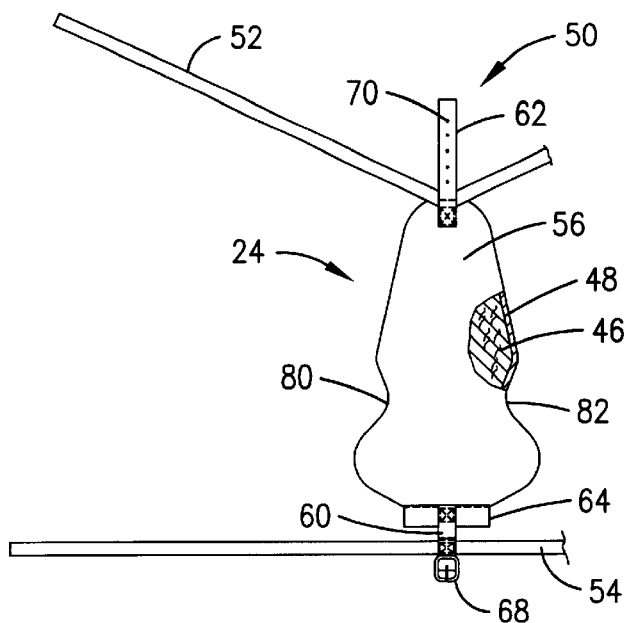
FIG. 1 is a crupper side elevational view of a crupper pad according to the present invention.
Figure 2:
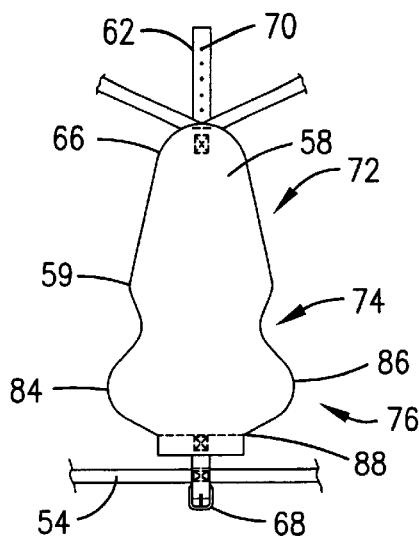
FIG. 2 is a tail side elevational view of the crupper pad of FIG. 1.

Referring to FIGS. 1 and 2, the crupper pad 24 includes a flexible padding material 46, a flexible outer sheath 48, an attachment strap 50, and tail securement straps 52, 54. The flexible padding material is preferably washable and comprises a relatively high density material. The outer sheath 48 substantially encloses the padding material 46 and includes a relatively course wear resistant material 56 covering a crupper side of the padding material and a relatively smooth tail engaging material 58, such as satin, covering a tail side of the padding material 46. The wear resistant material protects the padding material from wear against the rest 42 of the crupper 32, and the smooth tail material 58 protects the tail and rump of the horse from sores which, in the absence of the crupper pad, would be caused by the crupper. The wear resistant material 56 is preferably sown to the smooth material 58 around a perimeter 59 of the crupper pad.

The attachment strap 50 comprises a buckle portion 60 and an apertured portion 62 for adjustably connecting with the buckle portion 60. The buckle portion 60 is preferably connected to a hinged base end 64 of the crupper pad, and the apertured portion is preferably connected to a rounded tail end 66 of the crupper pad 24. A buckle 68 is preferably connected to the free end of the buckle portion 60 and can be connected to one of a plurality of apertures 70 formed along the length of the apertured portion 62 of the attachment strap 50. The attachment strap 50 extends along a central longitudinal axis of symmetry of the crupper pad, and when the crupper pad is strapped onto the crupper, the attachment straps are positioned to the rear of the crupper and extend parallel to the longitudinal axis of the crupper pad and a longitudinal axis of the crupper tail rest 42.

The tail securement straps 52, 54 comprise elongated straps of strong tieable material. Alternatively, VELCRO® can be used to connect the straps. The upper pair of tail securement straps 52 are connected to the tail end 66 of the crupper pad 24. The upper pair 52 extend away from the crupper pad in an opposed relationship at an upward angle relative to the longitudinal axis and away from the base end 64, and the lower pair of tail securement straps 54 are preferably connected to the buckle portion 60 of the attachment strap 50 adjacent to the base end 64 of the crupper pad. The lower pair 54 extend away from the crupper pad in opposite directions substantially perpendicular to the longitudinal axis. The upper tail securement straps 52 are sufficiently long to extend around the crupper pad 24, crupper 32, horse's tail 30, and top tail pad 26 in opposite directions and still tie the free ends of the straps together. The angle of the upper securement straps positions them properly for tieing around the assembly 20. The lower tail securement straps are equivalent in length, so that the free ends thereof can be tied together after being wrapped around the assembly in substantially opposite directions.

The tail securement straps 52, 54 each preferably comprises a single strap attached to the crupper pad at their middle, but they each can be formed by separate straps extending away from the opposite sides of the crupper pad. The connections between the attachment straps and the crupper pad and between the tail securement straps and the crupper pad are preferably sown connections with the straps positioned on the crupper side of the pad. The angle of the upper tail securement straps 52 is formed by folding a unitary strap over at its middle.

The crupper pad 24 has an elongated tail padding section 72, a foot section 74, and a base section 76 which combine to define the perimeter 59 which is especially configured to mate with the crupper 32. The tail padding section 72 is adjacent the tail end 66 and has a medium width configured for fitting in the arc of and padding the tail rest 42 of the crupper. The tail section preferably tapers in width along its length in a direction from the base end 64 to the tail end 66 and connects tangentially with the arc of the rounded tail end 66.

The foot section 74 is positioned near the middle of the crupper pad between the tail section 72 and the base section 76, and the foot section includes opposed concave curves 80, 82 intersecting the end of the tail section 72. The foot section has a small width to fit between the feet 34 of the crupper.

The base section 76 is adjacent the base end 64 of the crupper pad and includes opposed convex curves 84, 86. The convex cuves 84, 86 intersect tangentially with the concave curves 80, 82 and terminate in a hinged edge 88 integral to the hinged base end 64 which has a small width sized to fit between the feet 34 of the crupper, The hinged edge enhances attachment of the crupper pad to the crupper. The base section 76 has a large width and pads fie base 44 and feet 34 of the crupper thereby protecting the horse's rump from sores, Specifically, the convex portions form foot pads which are interposed between the feet 34 of the crupper and the horse's rump to keep the crupper from rocking as described above. Each width of the crupper pad is substantially continuous in that there are no gaps which would inhibit the padding function of the crupper.

Figure 3:
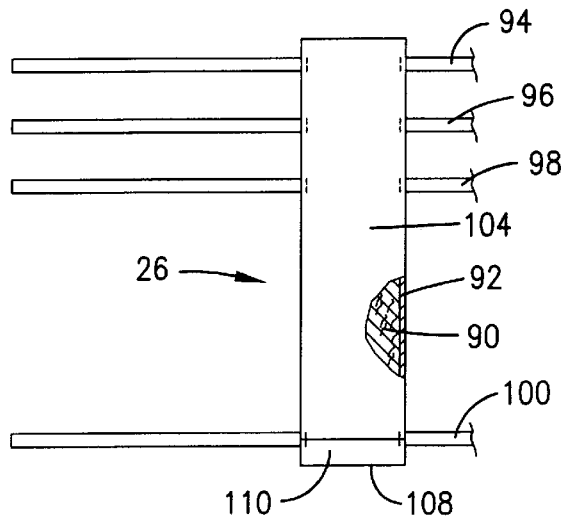
FIG. 3 is an upper side elevational view of a top tail pad according to the present invention.
Figure 4:
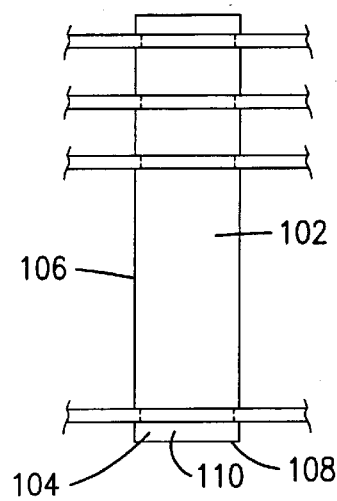
FIG. 4 is a tail side elevational view of the top tail pad of FIG. 3.

Referring to FIGS. 3 and 4, the top tail pad 26 includes a flexible top tail padding material 90, a top tail outer sheath 92, and a plurality of elongated top tail pad securement straps 94, 96, 98, 100. The top tail pad 26 is preferably rectangular and has a length sufficient to arc over the crupper. The top tail padding material 90 is preferably the same washable and relatively high density material as in the crupper pad 24. The top tail outer sheath 92 substantially encloses the padding material 90 and includes a relatively course wear resistant material 102 covering an upper side of the padding material and a relatively smooth tail engaging material 104 covering a tail side of the padding material 46. The wear resistant material protects the padding material from wear against external surfaces in the stall, and the smooth tail material 58 protects the tail of the horse from sores.

The wear resistant material 102 is preferably sown to the smooth material 104 around a rectangular perimeter 106 of the tail pad with the exception that, at a base end 108 of the tail pad 26, the smooth material continues around the base end and covers a base section 110, which contacts the horse's rump, on both the top and tail sides of the tail pad 26.

The three pairs of tail straps 94, 96, 98 are spaced apart and positioned adjacent to a top end 112 of the tail pad 26. The first pair 94 is closest to the top end 112, and the second pair 96 is positioned between the first pair 94 and the third pair 98 with the third pair 98 being positioned farthest away from the top end 112. The tail straps 94, 96, 98 are sufficiently long to extend from the tail pad and tie to the bottom rings 38 of the crupper.

The base pair top tail pad securement straps 100 are secured adjacent to the base end 108 of the tail pad 26 and form a separation between the smooth material 104 and the wear resistant material 102 on the upper side of the tail pad 26. The base pair of straps 100 are sufficiently long to tie around the tail set straps 40 on the back of the horse. Thus, the base straps attach to the tail set adjacent to the top rings 36 of the crupper. Like the crupper pad securement straps, each of the tail set straps 94, 96, 98, 100 preferably comprises a single strap though they can be made up of two opposing straps each. Preferably, the tail pad securement straps are sown onto the upper side of the tail pad and extend away from the tail pad substantially perpendicular to the tail pads length.

The spacer pad 28 is preferably made from the same material as the crupper and tail pads, but it is not enclosed in a sheath because in use it is positioned between the tail rest 42 and the crupper pad. The spacer pad 28 includes a circular base portion 114, a middle transition portion 116, and an elongated tail portion 118.

The circular portion 114 is positioned adjacent to the base 44 of the crupper 32, and the tail portion 118 extends up into the tail rest 42 to properly position the tail in the crupper 32. The transition portion 116 makes a tangential junction with the circular portion 114 and narrows from the base portion toward the tail portion.

Figures 6, 7:
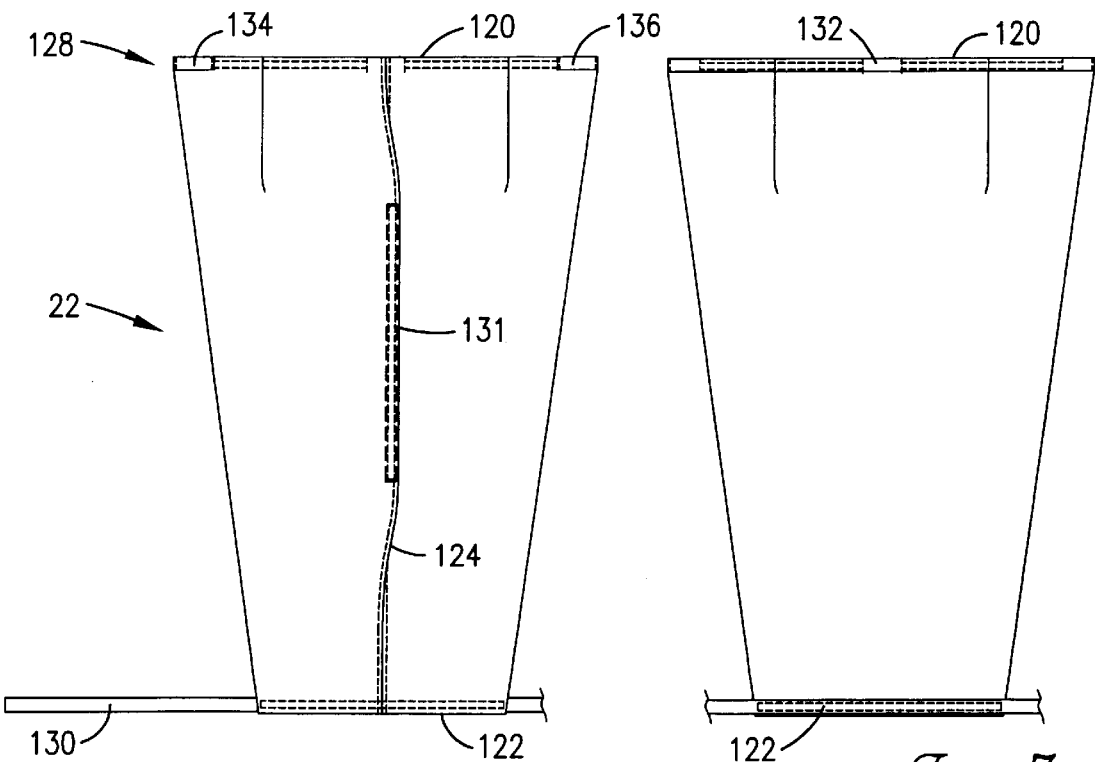
FIG. 6 is a rear elevational view of a tail bag according to the present invention.
FIG. 7 is a front elevational view of the tail bag of FIG. 6.

Referring to FIGS. 6 and 7, the tail bag 22 is fabricated with a moisture penetration resistant and flexible sheet material, and the tail bag includes a top 120, bottom 122, and an opening 124 to an internal cavity 126 (FIG. 9). The tail bag 22 is also provided with a top attachment mechanism 128 adjacent to the top 120 of the tail bag and a bottom attachment mechanism 130 adjacent to the bottom 122 of the tail bag.

When attached to the tail set, the opening 124 faces away from the horse. The opening preferably extends from the top 120 to the bottom 122 and is centrally located. The opening is provided with a closure mechanism 131 which preferably comprises cooperating VELCRO® strips on opposite sides of the opening 124. The opening receives the horse's tail 30 into the internal cavity to inhibit contaminants such as feces, urine, and dirt from soiling the tail.

The top attachment mechanism 128 attaches the tail bag to the tail set adjacent to and above the horse's anus and urethra. Preferably, the tail bag is used in combination with the crupper pad 24 and utilizes the crupper pad attachment straps 60, 62 to complete its connection to the tail set. The top attachment mechanism includes a center loop 132, a first corner loop 134, and a second corner loop 136 which receive the attachment straps therethrough, as described below, to attach the tail bag to the crupper. The center loop 132 is on the side of the tail bag opposite the opening 124, and the corner loops 134, 136 are on the same side of the tail bag as the opening 124 and are positioned at the top cones of the tail bag. Further, the length of the top 120 of the tail bag is longer than the bottom 122 of the tail bag to connect the tail bag to the bottom rings 38 of the crupper. Thus, the tail bag 22 comprises a trapezoidal configuration.

The bottom attachment mechanism 130 comprises a unitary bottom strap connected across the length of the bottom 122 and to the side of the tail bag opposite the opening 124. The bottom strap is centrally attached to the tail bag 22 and extends away from the tail bag in opposite directions substantially perpendicular to a longitudinal axis of symmetry of the tail bag. The bottom strap 130 preferably ties around the tail set straps 40 on the back of the horse adjacent to the top rings 36 of the crupper 32.

Figure 11:
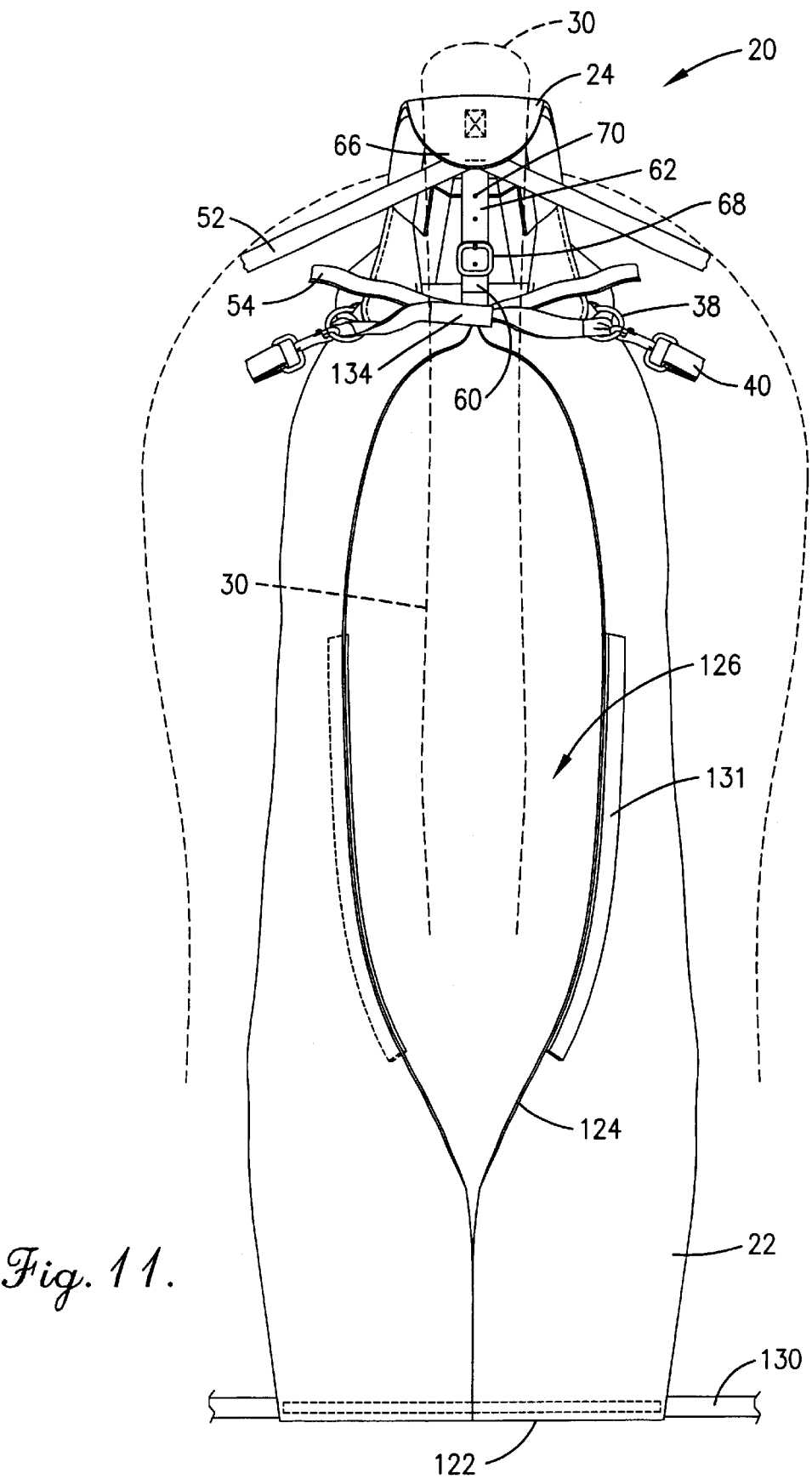
FIG. 11 is a rear view of the crupper padding and tail positioning set of FIG. 9 in combination with the tail bag of FIG. 6 illustrating connection of the crupper pad of FIG. 1.

Referring to FIGS. 8–11, to connect the assembly 20 and tail bag 22, the crupper 32 is removed from the horse, and the crupper pad 24 is positioned in the crupper 32 with the foot section 74 positioned between the feet 34 of the crupper. If necessary to properly position the horse's tail 30, the spacer pad 38 is inserted in the tail rest 42 before the crupper pad 24 is positioned, so that the spacer pad 38 is between the tail rest 42 and the crupper pad 24. The attachment straps 60, 62 are pulled to the rear of the crupper but not buckled. The buckle strap 60 is inserted through the center loop 132 of the tail bag 22, and one of the first and second corner loops 134, 136 is inserted through the corresponding bottom ring 38. In FIG. 10, the second corner loop 136 is inserted through the corresponding bottom ring 38, and then the buckle strap 60 is inserted through the second corner loop 136. The first corner loop 134 is then inserted through the other bottom ring, and the buckle strap 60 is inserted through the second loop. Then the buckle strap 60 and aperture strap 62 are pulled tight and buckled together as shown in FIG. 11. The crupper 32 is then put in place and hooked to the tail set straps 40. Thus, the spacer pad 38, and crupper pad 24 are interposed between the horse.'s tail 30 and the crupper 32.

Referring to FIGS. 12 and 13, the top tail pad 26 is then placed over the top of the horse's tail 30, and the base pair of tail pad securement straps 100 are tied around the tail set straps 40 adjacent to the top rings 36 of the crupper 32. The three pairs of tail set securement straps 94, 96, 98 are tied to the corresponding bottom rings 38. The crupper pad tail securement straps 52, 54 are then looped around the top tail pad 26 and tied. Preferably, the lower pair of securement straps 54 extend from their connection to the buckle strap 60 down through the center loop 132, as best shown in FIG. 10, so that as the lower pair of securement straps 54 is tightened, the tail bag 22 is pulled higher relative to the crupper 32. Thus the tail pad and its straps in combination with the crupper pad tail securement straps operate to hold the tail in the crupper.

After the crupper pad 24 is attached, the horse's tail can be inserted into the internal cavity 126 of the tail bag 22, and after the tail securement straps 52, 54, 94, 96, 98 are tied, the bottom 122 of the tail bag is lifted up over the assembly 20 and the horse as shown in FIG. 14. The bottom strap 132 is then tied around the tail set straps 40 on the horses back to hold the substantially entire tail bag above the anus and urethra of the horse.

The crupper padding and tail positioning assembly 20 according to the present invention provides a durable and much needed crupper pad to prevent sores from wearing on a horse's tail and rump from the crupper. The crupper pad 32 also operates to stabilize the crupper making it more comfortable for the horse. The tail bag 22 is attached and configured, so that contaminants are not introduced into the tail bag and encloses the horse's tail to keep it clean.

Thus, a crupper padding and tail positioning assembly and a tail bag are disclosed which utilizes a uniquely configured crupper pad and uniquely attached tail bag to hold a horse's tail in a tail set and keep the tail clean thereby improving presentation of the horse's tail. While preferred embodiments and particular applications of this invention have been shown and described, it is apparent to those skilled in the art that many other modifications and applications of this invention are possible without departing from the inventive concepts herein. It is, therefore, to be understood that, within the scope of the appended claims, this invention may be practiced otherwise than as specifically described, and the invention is not to be restricted except in the spirit of the appended claims. Though some of the features of the invention may be claimed in dependency, each feature has merit if used independently.

What is claimed is:

1. A crupper pad in combination with a tail crupper, and the crupper pad being interposable between the tail crupper of a tail set and a horse's tail and rump to pad the horse's tail and rump from the tail crupper, the crupper pad comprising:

a flexible padding material having a perimeter, a longitudinal axis, a crupper side, a tail side, a base end, and a tail end; and the flexible padding material including:
a first section having a first substantially continuous width for padding a first portion of the crupper; and
a second section having a second substantially continuous width for padding a second portion of the crupper.

2. The combination according to claim 1 wherein the padding material further comprises a third section between the first section and the second section, and having a third width for padding a third portion of the crupper.

3. The combination according to claim 2 wherein the first section comprises a base section for padding a base of the crupper, the second section comprises a tail padding section for padding a tail rest of the crupper, and the third section comprises a foot section for padding feet of the crupper.

4. A crupper pad in combination with a tail crupper, and the crupper pad being interposable between the tail crupper of a tail set and a horse's tail and rump to pad the horse's tail and rump from the tail cropper, the crupper pad comprising:

a flexible padding material having a perimeter, a longitudinal axis, a crupper side, a tail side, a base and, and a tail end;

the flexible padding material including:
a first section having a first substantially continuous width for padding a first portion of the crupper;
a second section having a second substantially continuous width for padding a second portion of the crupper; and
a length sufficiently long to cover a tail rest of the crupper and wrap under a base of the crupper.

5. A tail bag in combination with a crupper pad for inhibiting feces, urine, dirt, and other contaminates from soiling a horse's tail, the tail bag comprising:

a flexible sheet material defining an internal cavity and having a top, a bottom, and an opening to the internal cavity, the flexible sheet material being operable to inhibit feces, urine, dirt, and other contaminates from soiling a horse's tail;

a first attachment mechanism connected to the sheet material for connection to a tail set adjacent and above the horse's anus;

a second attachment mechanism connected to the sheet material for connection to a tail set adjacent and above the horse's anus; and at least one of the first and second attachment mechanisms adapted to pass through a ring of a crupper of a tail set.

6. The combination according to claim 5 further comprising a third attachment mechanism connected to the sheet material adjacent to the top of the sheet material for connection to a tail set adjacent and above the horse's anus, and the third attachment mechanism adapted to pass through a ring of a crupper of a tail set.

7. The combination according to claim 5 wherein another one of the first and second attachment mechanisms comprises a bottom attachment mechanism connected to the sheet material adjacent a bottom of the sheet material for connecting the bottom of the bag to the tail set.

* * * * *